Sept. 2, 1947.   F. F. MILLER, JR   2,426,701
FLEXIBLE HOUSING FOR UNIVERSAL JOINTS, ETC.
Filed Dec. 10, 1945

INVENTOR.
FRED F. MILLER Jr.
BY
Whittemore Hulbert + Belknap
ATTORNEYS

Patented Sept. 2, 1947

2,426,701

UNITED STATES PATENT OFFICE 2,426,701

FLEXIBLE HOUSING FOR UNIVERSAL JOINTS, ETC.

Fred F. Miller, Jr., Berkley, Mich., assignor to The Gear Grinding Machine Company, Hamtramck, Mich., a corporation of Michigan Application December 10, 1945, Serial No. 634,029

5 Claims. (Cl. 64—32)

1

The invention relates to housings for universal joints and similar mechanisms which include relatively angularly movable members. More particularly, the invention relates to constructions in which the sealing means between the relatively movable members is formed by an annular member of flexible liquidproof material having a return bent cross section. In the present state of the art sealing means of this type have been extensively used but difficulty has been experienced in maintaining an oilproof joint between the flexible member and the rigid portion of the housing. This is for the reason that when the mechanism is in operation, centrifugal force will develop considerable pressure on the lubricating oil within the housing tending to force it through the joint between the flexible member and the rigid housing. If the flexible member is formed of rubber-like material, this is usually vulcanized to the rigid housing and sufficient pressure on the oil may break the vulcanized joint.

It is the object of the instant invention to obtain a construction of housing including such flexible member in which the oil is excluded from the vulcanized joint so that regardless of the pressure on the oil it cannot escape. To this end the invention consists in the construction as hereinafter set forth.

Figure 1:
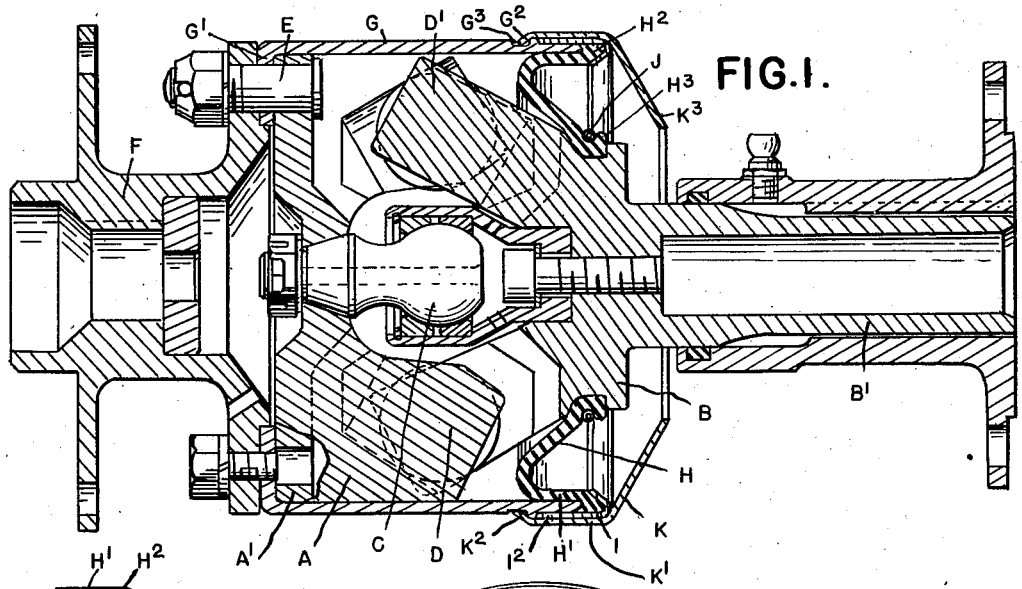
Fig. 1 is a longitudinal section through a universal joint showing my improved oilproof housing applied thereto.
Figure 2:
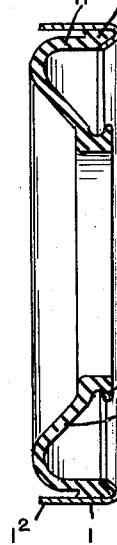
Fig. 2 is a cross section through the flexible member before attachment of the same to the rigid housing.
Figure 4:
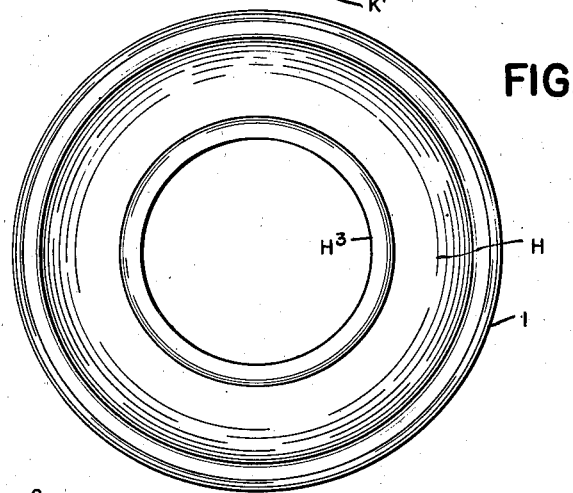
Fig. 4 is a side elevation of Fig. 2.

My invention is applicable to various types of universal joints but, as illustrated in Fig. 1, A and B are the relatively angularly movable members of the joint. C is a central ball and socket connection between these members and D and D' are interengaged portions on the two members which transmit the torque from the one to the other. The member A has a radially extending head portion A' secured by bolts E to a rotary member F and the member B has a shaft portion B' constituting the angularly movable rotary member.

My improved housing comprises a cylindrical member G having at one end an inwardly extending flange G' which is clamped between the head A' and the member F by means of the bolts

2

E. The member G surrounds the universal joint and extends axially beyond the interengaged portions D and D' thereof. H is a flexible annular member of return bent cross section, the outer periphery of which is attached to the member G while its inner periphery is attached to the member B there being sufficient space between said members G and B for the maximum relative angular movement thereof. As has been stated, difficulty has been experienced in forming an oilproof joint between the flexible member and the outer rigid housing member which difficulty I overcome by the following construction. The member H preferably formed of a synthetic rubber is so fashioned that its outer portion H' is normally cylindrical and will lie in contact with the inner face of the member G. At the outer end of the portion H' is a bead portion $H^2$ which extends radially outward over the end of the member G. This portion $H^2$ is preferably of a dovetail cross section and the end of the member G is at a similar angle to contact therewith. Secured to this bead portion, preferably by vulcanizing, is a cylindrical member I having a return bent portion I' for embracing the bead and an axially extending portion $I^2$ which telescopically engages the outer surface of the end portion of the member G and abuts against a shoulder $G^2$ on said member. The inner peripheral portion of the member H has a bead $H^3$ which fits within a groove in the member B and is secured therein by a surrounding wire band J or other suitable means. For securing the member I to the member G, there is a surrounding member K having a cylindrical portion K' which fits over the member I extending beyond the same and with its inner end $K^2$ crimped into engagement with a groove $G^3$ in the member G beyond the shoulder $G^2$. The member K also has a conical radially inwardly extending portion $K^3$ which forms a guard for the flexible member H but does not interfere with the free flexing of the latter.

Figure 3:
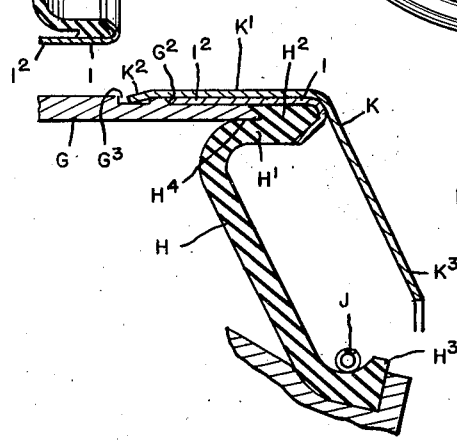
Fig. 3 is an enlarged section similar to a portion of Fig. 1 but with the relatively movable members of the joint in different angular relation.

With the construction as above described, it will be apparent that the housing may be readily applied to the assembled joint by first securing the members G to the head A', then telescopically engaging the member I with the member G, securing the bead $H^3$ of the member H in the groove of the member B by the band J and finally telescopically engaging the member K over the member I and crimping its inner end $K^2$ into the groove $G^3$. In normal position where the two members of the universal joint are in alignment with each other, the portion H' of the member H will closely fit the inner surface of the member G to exclude oil from passing between the same. When the members of the joint are in extreme position of relatively angular adjustment, there will still be a small portion $H^4$ of the member H lying in contact with the inner face of the member G (as shown in Fig. 3). If sufficient pressure is developed to force the oil between the portion $H^4$ and the member G, there is still the dovetail portion of the bead $H^2$ which is pressed into contact with the end of the member G by the members I and J. Thus, oil will not find access to the vulcanized joint between the bead $H^2$ and the member I and the return bend or hook portion $I'$ of the member I will form an additional securing means for holding the bead in position. Consequently, a perfect seal is formed which will retain the lubricant within the housing at all times.

What I claim as my invention is:

1. A housing for universal joints, etc. comprising a cylindrical member surrounding said joint and rigidly mounted on one member thereof, a flexible annular member of return bent cross section, the outer portion of the return bend normally lying against the inner face of said cylindrical member and terminating in a bead extending over the end thereof, a rigid annular member secured to said bead and telescopically engaging the outer surface of said cylindrical member to attach said flexible member thereto and to hold the bead portion thereof against the end of said cylindrical member, and means for securing the inner periphery of said flexible member to the complementary member of said universal joint.

2. A housing for universal joints, etc. comprising a cylindrical member surrounding said joint and rigidly mounted on one member thereof, a flexible annular member of return bent cross section, the outer portion of the return bend normally lying against the inner face of said cylindrical member and terminating in a bead extending over the end thereof, a rigid annular member having a return bent portion embracing said bead secured thereto and a portion telescopically engaging the outer surface of said cylindrical member to attach said flexible member thereto and to hold said bead against the end of said cylindrical member, and means for attaching the inner periphery of said return bent flexible member to the complementary member of said universal joint.

3. A housing for universal joints, etc. comprising a cylindrical member surrounding said joint and rigidly mounted on one member thereof, the free end of said cylindrical member being beveled, a flexible annular member of return bent cross section, the outer portion of the return bend normally lying against the inner face of said cylindrical member and terminating in a bead extending over and in contact with the beveled end thereof, a rigid annular member having a portion return bent to embrace said bead and a portion extending beyond the same to telescopically engage the outer surface of said cylindrical member to retain said bead in interlocking contact with the beveled end of said cylindrical member, and means for attaching the inner periphery of said flexible return bent member to the complementary member of said universal joint.

4. A housing for universal joints, etc. comprising a cylindrical member surrounding said joint and rigidly mounted on one member thereof, the free end of said cylindrical member being beveled, a flexible annular member of return bent cross section, the outer portion of the return bend normally lying against the inner face of said cylindrical member and terminating in a bead extending over and fitting against the beveled end of said cylindrical member, the outer surface of said bead being flush with the outer surface of said cylindrical member, a rigid annular member having a return bent portion embracing and vulcanized to said bead and a portion extending beyond the same and telescopically engaging the outer surface of said cylindrical member, means for securing the inner periphery of said flexible member to the complementary member of said universal joint, and a guard member having a cylindrical portion telescopically engaging said rigid annular member and extending beyond the same into interlocking engagement with said cylindrical member whereby said bead is retained in contact with the beveled end of said cylindrical member to form a dovetail joint therewith thereby forming a permanent sealing joint between said flexible member and cylindrical member.

5. A housing for universal joints, etc. comprising a rigid cylindrical member surrounding the joint and attached to one member thereof, and a flexible annular member between the free end of said cylindrical member and the complementary member of the universal joint, said flexible member being of a return bent cross section with the outer portion thereof normally lying against the inner surface of said cylindrical member and terminating in a bead extending outward over the end of said cylindrical member, a rigid annular member telescopically fitting the outer surface of said cylindrical member and having a return bent end portion embracing and vulcanized to said bead, a guard member having a cylindrical portion telescopically engaging the outer surface of said rigid annular member and extending beyond the same into clinching engagement with said cylinder member, said guard member having a conical guard portion extending inward from said cylindrical portion, and means for securing the inner end of said flexible annular member to the complementary member of the universal joint.

FRED F. MILLER, Jr.